United States Patent [19]

Hackett

[11] 4,319,349

[45] Mar. 9, 1982

[54] ULTRASONIC INTRUSION DETECTION SYSTEM

[75] Inventor: Kenneth R. Hackett, Boulder, Colo.

[73] Assignee: Pittway Corporation, Northbrook, Ill.

[21] Appl. No.: 947,039

[22] Filed: Sep. 29, 1978

[51] Int. Cl.³ .................. G01S 13/04; G01S 15/04; G08B 13/16
[52] U.S. Cl. ................................... 367/94; 340/554; 343/5 PD; 367/136
[58] Field of Search ............... 340/554; 343/5 PD; 367/93, 94, 136, 901, 904

[56] References Cited

U.S. PATENT DOCUMENTS

| | | | |
|---|---|---|---|
| 3,343,167 | 9/1967 | Rademacher | 343/5 PD |
| 3,665,443 | 5/1972 | Galvin | 367/94 |
| 3,683,325 | 8/1972 | Vlahos | 367/93 |
| 3,697,985 | 10/1972 | Faris et al. | 343/5 PD |
| 3,761,908 | 9/1973 | Gehman | 343/5 PD X |
| 3,805,165 | 4/1974 | Hoffman | 343/5 PD X |
| 4,035,798 | 7/1977 | Hackett | 343/5 PD |
| 4,054,871 | 10/1977 | Terrell et al. | 340/554 |
| 4,129,856 | 12/1978 | Humphries | 340/554 |
| 4,142,187 | 2/1979 | Nakayama | 343/5 PD X |
| 4,195,289 | 3/1980 | Cole | 340/554 |

*Primary Examiner*—John W. Caldwell, Sr.
*Assistant Examiner*—Joseph E. Nowicki
*Attorney, Agent, or Firm*—Charles E. Pfund

[57] ABSTRACT

Apparatus and method of processing in an ultrasonic alarm system to detect the doppler-shifted components which indicate the presence of an intruder. A master control applies to each of the transmitter transducers a signal which alternates between two frequencies at a modulation frequency. The output signal from the receiving transducer is synchronously detected and low pass filtered. The filtered signal is applied to electronics which respond to the presence of modulation frequency components in the filter output signal. A first embodiment utilizes a high-Q bandpass filter having a resonance frequency equal to the modulation frequency. In a second embodiment, the modulation frequency is used to effectively perform a correlation between the received signal and the modulation frequency.

30 Claims, 12 Drawing Figures

TRANSMITTER, MASTER CONTROL

RECEIVING AND PROCESSING FOR ONE OF A PLURALITY OF ZONES
WHEN NARROW BAND FILTERING IS USED

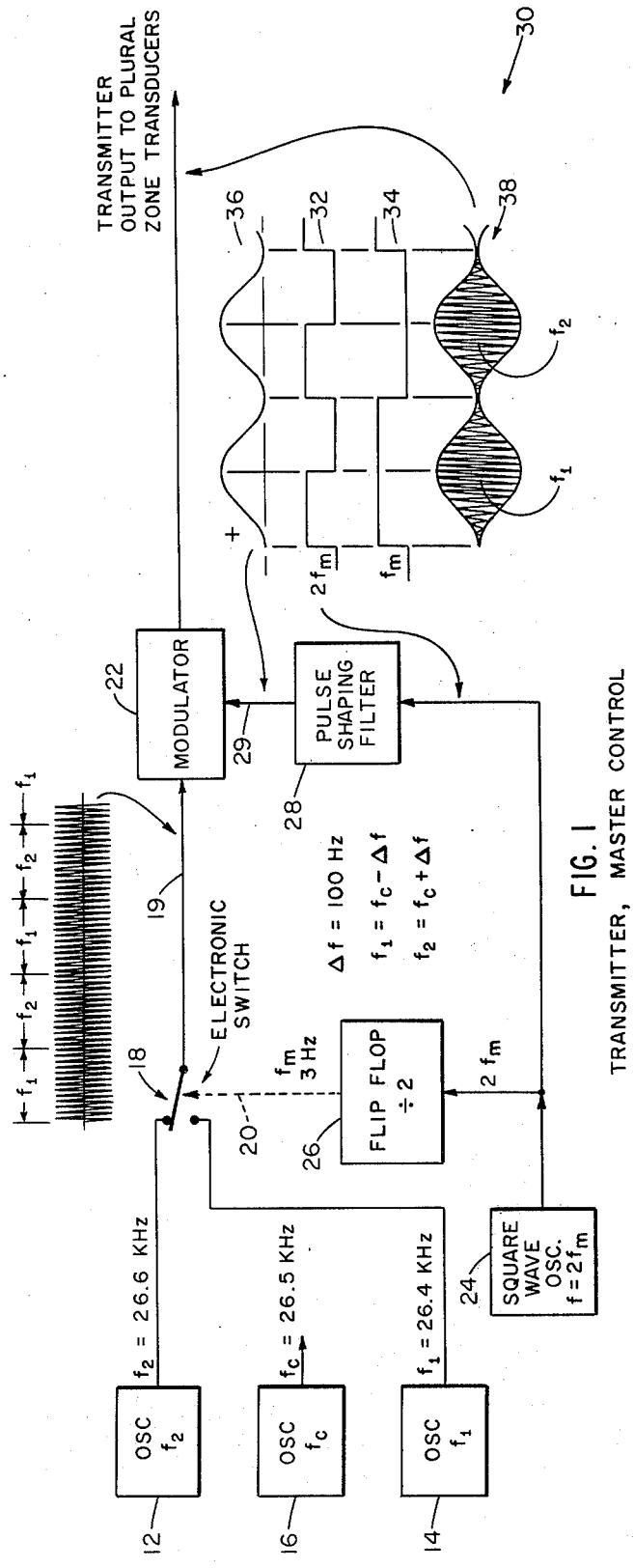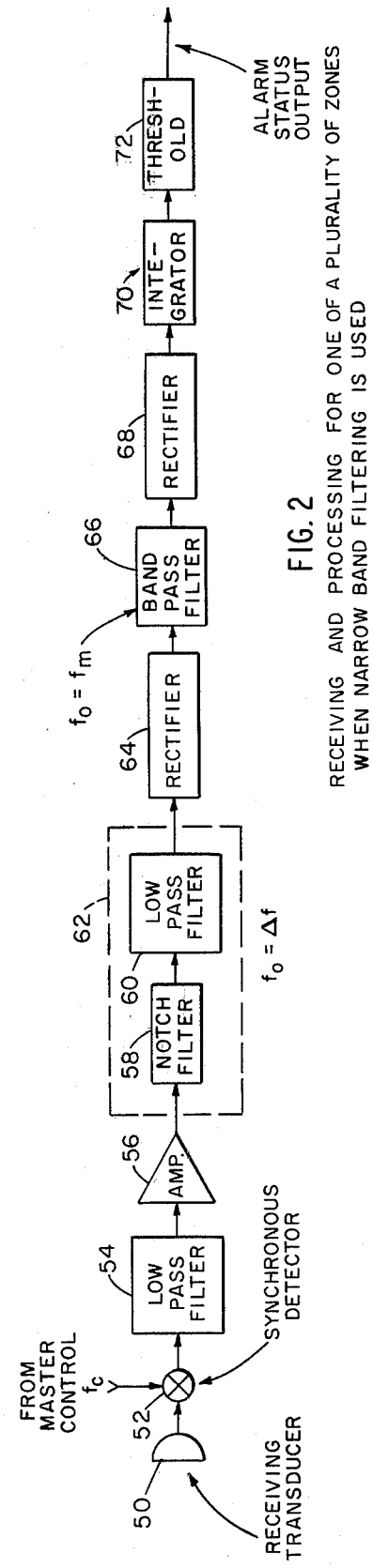
FIG. 1 TRANSMITTER, MASTER CONTROL
FIG. 2 RECEIVING AND PROCESSING FOR ONE OF A PLURALITY OF ZONES WHEN NARROW BAND FILTERING IS USED

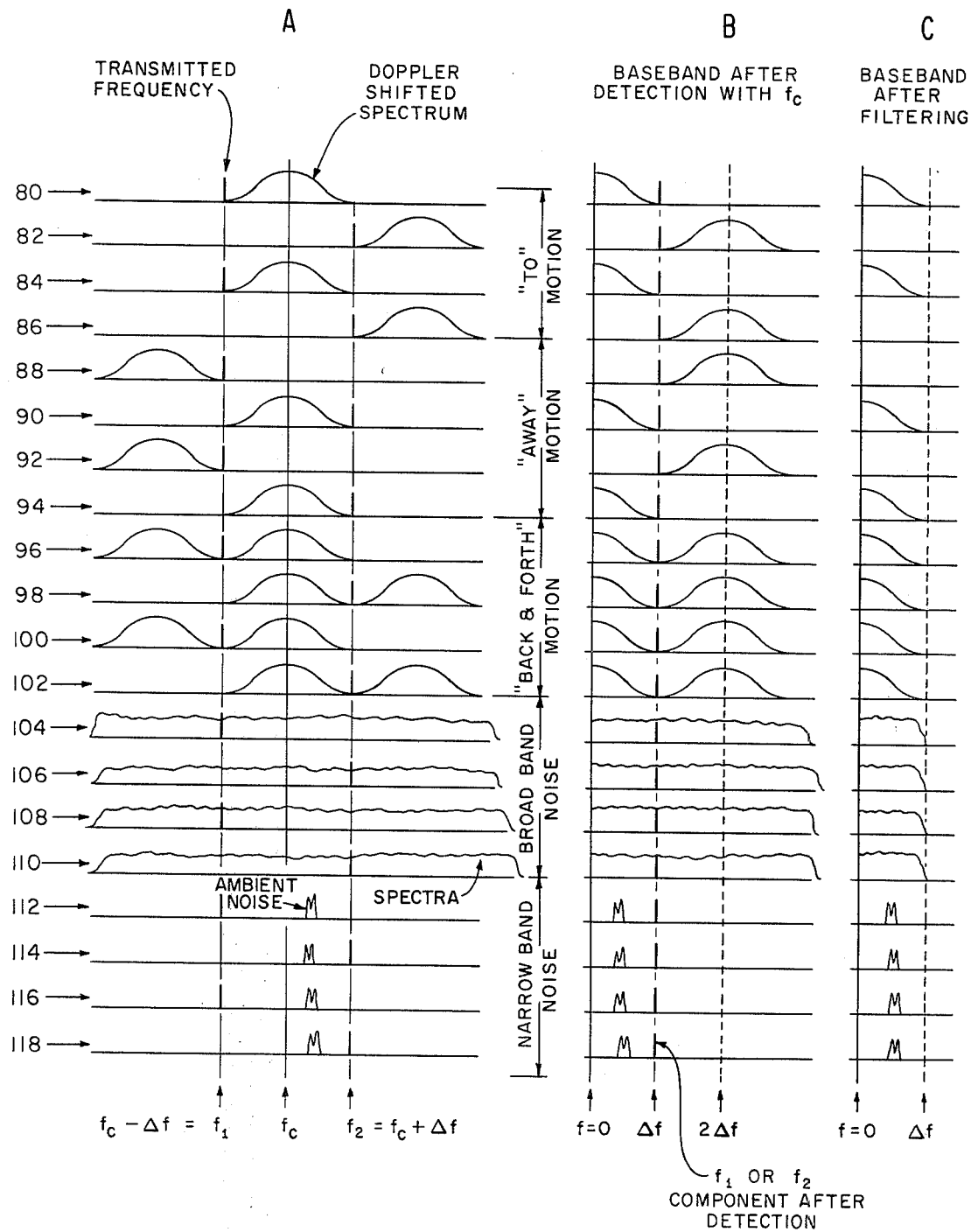
FIG. 3. A. ULTRASONIC SPECTRUM
B. BASEBAND SPECTRUM BEFORE FILTERING
C. AFTER FILTERING FOR A SEQUENCE OF TIME INTERVALS

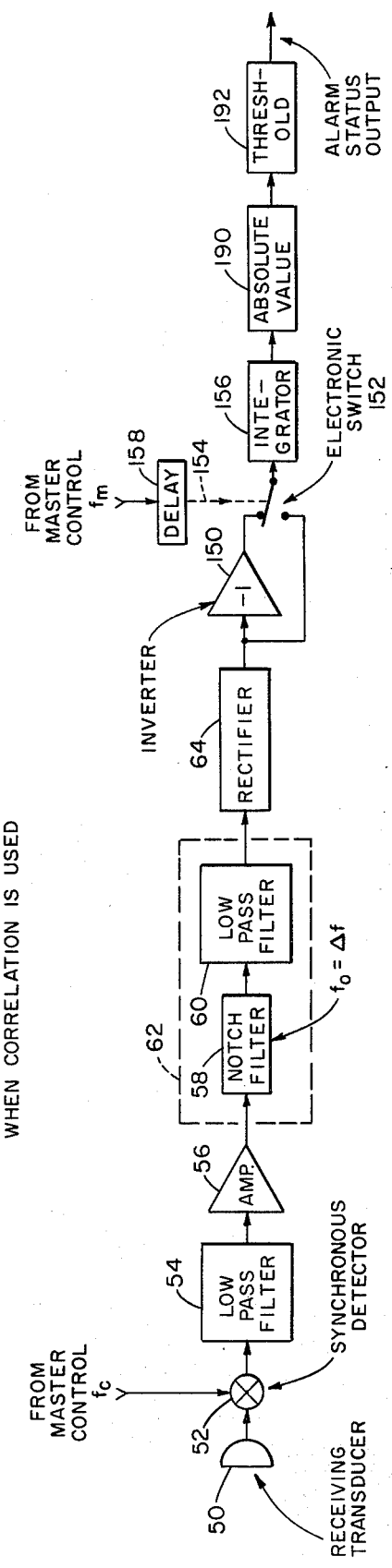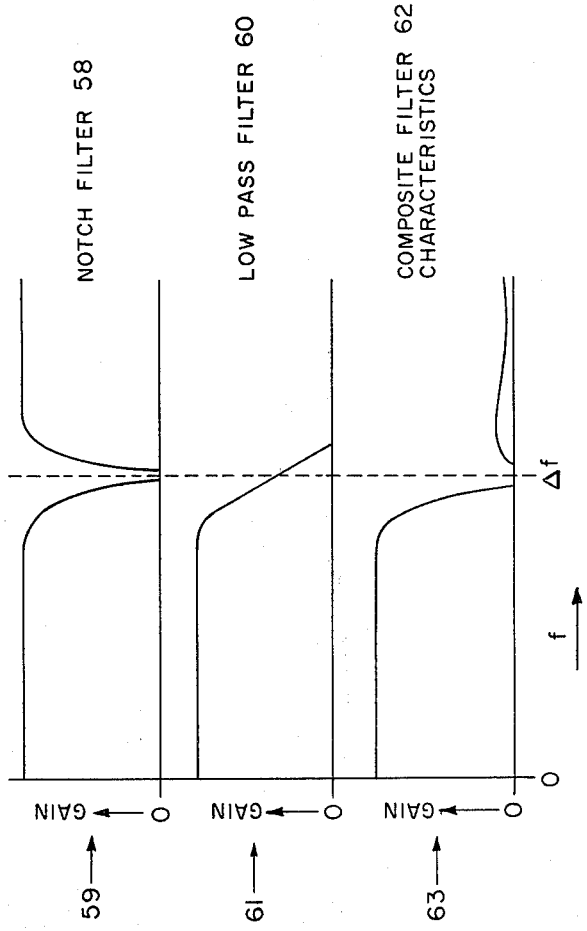

SYSTEM TIMING DIAGRAMS FOR DIFFERENT
TYPES OF MOTION AND DISTURBANCES.

BAND PASS FILTER CONFIGURATION

TIMING DIAGRAM FOR "TO" & "AWAY" MOTION
CORRELATING CONFIGURATION

TIMING DIAGRAM FOR "BACK & FORTH" MOTION
AND AMBIENT NOISE

CORRELATING CONFIGURATION

TIMING DIAGRAM FOR A TARGET AT
A NORMAL DISTANCE AND AN INTENSIVE DISTURBANCE
NEAR THE PAIR OF TRANSDUCERS.

CORRELATION CONFIGURATION

ULTRASONIC INTRUSION DETECTION SYSTEM

FIELD OF THE INVENTION

The present invention is concerned with intrusion alarm systems, and in particular with electronic processing circuitry for use in a multiple transducer intrusion alarm system.

BACKGROUND OF THE INVENTION

Ultrasonic detection systems are well known for the protection of buildings, warehouses, and other areas. The systems operate by having one or more transmitters which radiate ultrasonic soundwaves into an area to be protected. The ultrasonic waves are reflected by objects in the protected area, and these "echoes" are received by a receiving transducer which produces electrical signals in response thereto. The presence of intruding objects may be detected by monitoring the received echoes for doppler-shifted frequency components which are produced by the reflection of ultrasonic waves from a moving object.

The output signal from the receiving transducer is applied to electronic signal processing circuitry which detects the presence of a doppler-shifted echo indicative of an intruder. Usually the processor includes circuitry to discriminate between echoes caused by an intruder and echoes caused by movement of other objects in the protected area which would otherwise cause false alarms, such as flapping curtains and the like. Additional circuitry may also be included to discriminate against ambient noise in the frequency band being used.

It is frequently desirable to be able to protect large areas or several different areas with a single ultrasonic intrusion alarm system by providing a plurality of ultrasonic transducers and a plurality of ultrasonic receivers located in the areas to be protected. Since previous multiple transducer systems have required relatively complex and expensive circuitry to process the receiver output signal to detect an intruder, multiple transducer systems are usually implemented by applying all the receiver outputs to a single processor. Since only one relatively complex processor is required in such a system and since both the transmitting and receiving transducers are relatively inexpensive, several transmitters and receivers may be used to economically provide protection for a large area or a number of individual areas. However, such systems have the disadvantage that the processor is unable to distinguish between signals from different transducers. The only output that such a system can provide is that an intruder is somewhere within the protected areas. The processor is unable to indicate where the intruder is located within the protected area.

To provide a precise indication of which receiver has detected an intruder, a processor for each area and/or each receiving transducer may be used. However, current methods of processing the transducer output signals require relatively complex electronics, and providing such a processor for each of a plurality of receivers is generally too expensive to be practical, except in more critical installations.

SUMMARY OF THE INVENTION

The present invention is directed toward a new method of processing in an ultrasonic alarm system to detect the doppler-shifted components which indicate the presence of an intruder. In this method, a plurality of transmitting transducers are all driven from a single source. By suitably preprocessing the transmitter signal, the present system requires much simpler circuitry in the receiver than prior art systems to detect the presence of doppler-shifted signals. The receiver circuitry is simple enough that individual processors may be economically located at each receiver transducer. Thus, the output signal from each receiver provides a direct indication of whether an intruder has been detected by that receiver. These signals are applied to a master control which can provide an indication of where an intrusion has occurred in addition to the normal alarm signal. Since all of the transmitters are driven from a single source, the increase in complexity of the transmitter electronics is not significant; and a multiple transducer intrusion alarm system may be economically provided which is capable of providing an indication of where an intrusion has occurred.

Briefly, the preferred embodiment operates in the following manner. A master control applies to each of the transmitter transducers a signal which alternates between two frequencies offset above and below a reference frequency by equal amounts. The frequency of alternation is the modulation frequency. The output signal from the receiving transducer is synchronously detected with a signal having a frequency equal to the reference frequency and low-pass filtered so that components in the base band signal having frequencies higher than the offset frequency are eliminated. The filtered signal is then applied to electronics which respond to the presence of modulation frequency components in the filter output signal. Such components indicate the presence of an object in the protected zone which is moving relative to the transducers. These components are not produced by other objects in the protected zone which typically account for false alarms. Such objects include blowing curtains and doors which while moving do not have a net relative motion with respect to the receiver. Also, the processor rejects any ambient noise which may be present in the ultrasonic frequency range of the intrusion alarm system.

Two alternate circuit embodiments are presented for detecting the modulation frequency components. The first embodiment utilizes a high-Q bandpass filter having a resonance frequency equal to the modulation frequency. In the second embodiment, the modulation frequency is used to select between the low pass filter output signal and its inverse to effectively perform a correlation between the received signal and the modulation frequency.

DESCRIPTION OF THE DRAWINGS

The implementation and operation of the present invention will become more clear upon reading the following detailed description of the invention in conjunction with the accompanying figures, of which:

FIG. 1 shows the transmitter circuitry;

FIG. 2 is a block diagram of a receiver processor utilizing narrow band filtering;

FIG. 3 shows waveforms useful in explaining the operation of the present invention;

FIG. 4 shows the transfer function of filters used in the receiver of FIG. 2;

FIG. 6 shows an alternate embodiment of the receiver processor using correlation processing;

DETAILED DESCRIPTION OF THE INVENTION

Figure 5:
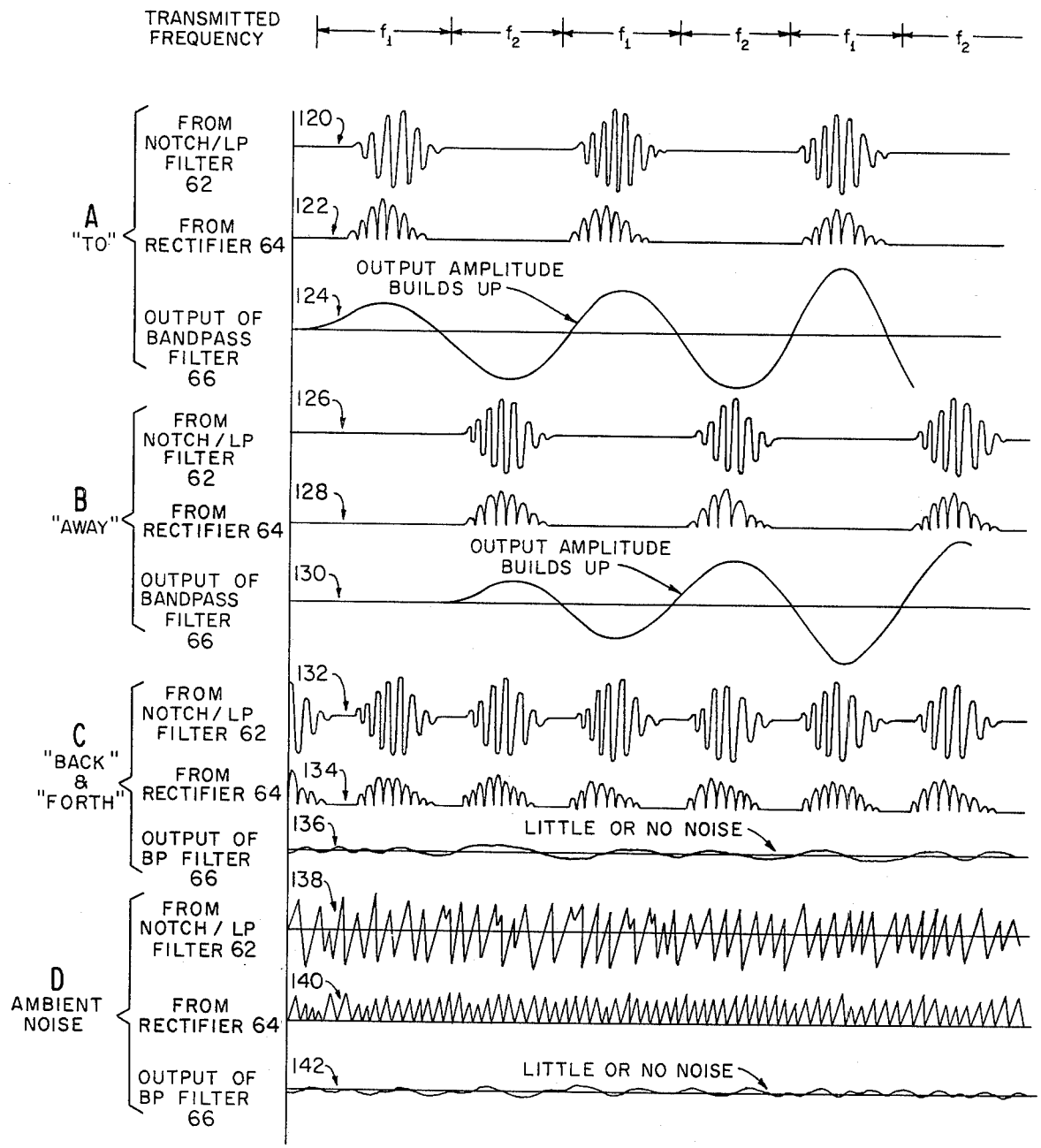
FIG. 5 shows timing diagrams useful in explaining the operations of the receiver processor shown in FIG. 3.

Referring to FIG. 1, there is shown circuitry suitable for providing the transmitter output signal applied to the transmitting transducers of the present alarm system. Typically, this circuitry is located within the alarm system master control, and the transmitter excitation signal is applied via a cable to each of the plurality of transmitters which are included in the system. The transmitter circuitry includes sources of two frequencies which are alternately applied to each of the transmitters. These frequencies are denoted as $f_1$ and $f_2$ and are equally spaced by an amount $\Delta f$ from a center or reference frequency, which will be denoted as $f_c$. The reference frequency $f_c$ is not applied to the transmitters, but is required by the receiver processing circuit. In the preferred embodiment described herein the reference frequency is 26.5 kHz. The offset frequency $\Delta f$ is 100 Hz and therefore frequency $f_1$ equals 26.4 kHz and frequency $f_2$ equals 26.6 kHz. In the embodiment shown in FIG. 1, $f_1$ and $f_2$ are shown as being produced by two oscillators 12 and 14. The carrier frequency, $f_c$ is produced by a third oscillator 16. It should be appreciated that use of three oscillators as shown in FIG. 1 is not necessary, and the required frequencies may be produced by other means.

The $f_1$ and $f_2$ frequency outputs from oscillators 12 and 14 are applied to an electronic switch 18. In response to a digital signal applied on line 20 to switch 18, switch 18 alternately selects $f_1$ or $f_2$ for application to a modulator 22. The signal on line 20 is typically a square wave signal which controls the state of switch 18, and the frequency of this signal is the modulation frequency which will be denoted as $f_m$. In the embodiment described herein, $f_m$ is typically on the order of 3 Hz.

A square wave oscillator 24 provides a square wave output signal having a frequency of $2f_m$. This signal is applied to a flip-flop 26 which divides the signal from oscillator 24 by two to produce the $f_m$ modulation frequency controlling switch 18. The output signal from oscillator 24 is also applied to a pulse shaping filter 28. Filter 28 attenuates the harmonics present in square wave output from oscillator 24, and the filtered signal is applied to modulator 22.

The relationship between the above-described signals may be seen more clearly by referring to the waveforms designated collectively as 30 in FIG. 1. The square-wave signal having a frequency of $2f_m$ is shown by waveform 32. This is divided down by flip-flop 26 to provide a square-wave signal having a frequency of $f_m$, as shown by waveform 34. The output from filter 28 in response to the signal applied thereto is shown by waveform 36. As shown in FIG. 1, the output waveform 36 from filter 28 is shifted by approximately 90° from the input waveform 32. This is due to the phase shift of filter 28.

In response to the $f_m$ signal applied to switch 18, switch 18 alternately applies frequencies $f_1$ and $f_2$ to modulator 22. For example, in the waveforms shown at 30, during the period that the $f_m$ signal 34 is high, frequency $f_1$ is applied to modulator 22; and when $f_m$ is low, frequency $f_2$ is applied to modulator 22.

In response to the signal from filter 28, modulator 22 modulates the amplitude of the signal applied thereto on line 19. The output waveform from filter 28 is such that it goes from zero to a maximum amplitude and back to zero. As shown in timing diagram 30, the output 36 from filter 28 is at zero amplitude at the time that switch 18 changes state from frequency $f_1$ to $f_2$ and back again. The net result is that the output from modulator 22 alternates between frequencies $f_1$ and $f_2$, the amplitudes of which are varied from zero to a maximum amplitude and back to zero in accordance with the output waveform from filter 28. This output waveform is shown as 38 in timing diagram 30. This waveform allows the transmitter transducers to alternately transmit ultrasonic signals of frequencies $f_1$ and $f_2$, and the switching between the two frequencies is accomplished in a manner which minimizes the production of spurious harmonics.

Referring to FIG. 2, one embodiment is shown of the receiver processing circuitry of the present invention. A receiving transducer 50 receives ultrasonic signals from the protected area. These signals include echoes from stationary objects within the protected area. Such doppler-shifted echoes may indicate the presence of an intruder or may be false alarm signals caused by the movement of any objects in the protected area. The unique processing circuitry described below is capable of discriminating between doppler-shifted signals indicative of the presence of an intruder and other signals received by transducer 50 which are not produced by an intruder and which, if not rejected, would produce false alarms.

Referring to FIG. 3, there is shown a series of waveforms which will be referred to to illustrate the operation of the circuit of FIG. 2. The different lines in FIG. 3, denoted as lines 80 through 118 show the spectra of the received signals under different conditions in the protected area. The waveforms in each of lines 80 through 118 are divided into three columns, labeled "A," "B," "C." Column A is representative of the spectrum of the signal received by receiving transducer 50, and columns B and C show the resulting waveforms at different points in the receiver circuitry, as described below.

Referring to lines 80 to 86 of FIG. 3, the spectrum received by transducer 50 is shown in column A for the situation where an intruding object is present and moving toward the receiving transducer. (The case of movement away from the receiver is discussed below). Line 80 shows the received spectrum when the transmitter is transmitting frequency $f_1$. As can be seen from FIG. 3, there is a large spectral component at the transmitted frequency $f_1$, and there is a wider spectral response which is the doppler-shifted spectrum caused by echoes from the moving intruder. The received signal shown in column A of line 80 is applied to a synchronous detector 52, and the reference frequency $f_c$ is applied to a second input of detector 52.

The output of detector 52 is applied to a low-pass filter 54 which serves to eliminate the higher frequency components produced by the synchronous detection process. Again referring to FIG. 3, column B of line 80 shows the spectrum at the output of low pass filter 54. The detection process shifts the received frequency spectrum of column A, and the doppler-shifted spectrum now appears as a very low frequency. The synchronous detection process also shifts the spectral line corresponding with the transmitted frequency to a frequency equal to $\Delta f$, the offset frequency between $f_1$ and $f_c$.

The output from low pass filter 54 is applied to an amplifier 56, and the output of amplifier 56 is applied to a notch filter 58. Notch filter 58 has a center frequency equal to $\Delta f$, the offset frequency between $f_c$ and the two frequencies transmitted by the transmitter. Notch filter 58 serves to eliminate the strong $\Delta f$ frequency component in the output of low pass filter 54, shown in column B of FIG. 3.

Following notch filter 58 is a second low pass filter 60. Low pass filter 60 has a break frequency also equal to $\Delta f$ and serves to eliminate frequency components lying above $\Delta f$. The output of low pass filter 60 is shown in column C of FIG. 3. It can be seen that when the traansmitted frequency is $f_1$ and an object is moving towards the receiver 50, part of the doppler-shifted spectra produced by the moving object appears at the output of low pass filter 60.

The frequency response of filters 58 and 60 is shown in FIG. 4. Graph 59 shows the frequency response of notch filter 58. The frequency response of low pass filter 60 is shown in graph 61 of FIG. 4. It should be appreciated that notch filter 58 and low pass filter 60 may be implemented by means of a single circuit having the desired composite characteristics. This is indicated via dotted box 62 in FIG. 2. Graph 63 in FIG. 4 shows the frequency response required of such a composite filter.

Returning to FIG. 3, line 82 shows spectra similar to that shown in line 80, except that line 82 corresponds to the periods that the transmitter is transmitting frequency $f_2$ rather than $f_1$. In column A, similarly to line 80, there is a strong frequency component at the transmitter frequency $f_2$, and above that is a broader spectrum caused by the doppler-shifted echoes from a moving intruder. In column B of line 82, the output from low pass filter 54 is shown. It can be seen that after detection of the received signal with the reference frequency $f_c$, the output from low pass filter 54 is similar to that shown in line 80 except that the doppler-shifted spectrum lies above frequency $\Delta f$. When the output from filter 54, shown in column B of line 82, is applied to notch filter 58 and low pass filter 60, the spectral component at $\Delta f$ is eliminated by the notch filter and the doppler-shifted spectrum lying above $\Delta f$ is also eliminated by low pass filter 60. The result is that during the period that the transmitted frequency is $f_2$ and an object is moving towards the receiving transducer, the output of low-pass filter 60 contains no signal. This is shown in column C.

Lines 84 and 86 correspond respectively to lines 80 and 82 and are representative of the repetitive nature of the spectra shown in lines 80 and 82 as the transmitter alternately switches between frequency $f_1$ and $f_2$. As can be seen by referring to FIG. C for lines 80 through 86, the output from low pass filter 60 contains signal components only during the period when the transmitter is transmitting frequency $f_1$. Referring to FIG. 5, the actual signal appearing at the output of low pass filter 60 is shown by waveform 120. This waveform consists of doppler-shifted signal components, and these signals repetitively occur with a repetition frequency of $f_m$.

The output from low pass filter 60 is applied to a rectifier 64. Rectifier 64 eliminates the negative excursions of the signal shown by waveform 120; and the output waveform form rectifier 64 is shown by waveform 122. The output from rectifier 64 is applied to a bandpass filter 66. This filter is a relatively high-Q or narrowband filter having a center frequency equal to the modulation frequency, $f_m$. In response to pulses applied to filter 66 which have a frequency equal to the modulation frequency, filter 66 starts to "ring;" and in response to an input corresponding to waveform 122, the output of bandpass filter 66 oscillates at a frequency equal to $f_m$, and the amplitude of this oscillation increases in response to subsequent pulses, as shown in waveform 122.

The output from bandpass filter 66 is applied to a second rectifier 68. The output from rectifier 68 consists of pulses occurring at the modulation frequency whose amplitude is proportional to the strength and duration of the doppler-shifted signal received by receiving transducer 50. These pulses are applied to an integrator 70, and when its output exceeds a threshold determined by a threshold circuit 72, an alarm signal is generated.

The previous paragraphs have described the operation of the circuitry shown in FIG. 2 in response to signals produced by an intruder moving toward the receiving transducer 50. The waveforms produced by an intruding object moving away from the receiving transducer are shown in FIG. 3 in lines 88 through 94 and in FIG. 5 by waveforms 126 through 130. In column A, the waveforms in lines 88 to 94 correspond with the signal received by transducer 50. As before, there are strong spectral components existing at the transmitted frequencies $f_1$ and $f_2$. Additionally, there are broader spectral components produced by the doppler-shifted echoes. Since the motion is away from the receiving transducer, the doppler-shifted components lie below rather than above the frequencies $f_1$ and $f_2$ transmitted by the transmitter.

Referring to columns B and C in lines 88 to 94, it can be seen that the spectra of the output signals from low pass filter 62 are similar to that described above in reference to lines 80 to 86 except that the doppler-shifted signal components occur at the output of low pass filter 60 only during periods when the transmitter is transmitting the higher $f_2$ frequency. Referring to FIG. 5, waveform 126 shows the signals appearing at the output of low pass filter 60. It can be seen that the doppler-shifted frequency components occur when the transmitter is transmitting frequency $f_2$. The waveform in 126 is rectified by rectifier 64 to produce the waveform 128. This waveform results in an output from bandpass filter 60, shown by waveform 130, in the same manner as described previously for the case of motion towards the transducer. This signal is then rectified, integrated and compared with a threshold level to produce an alarm signal, as described above.

Generally the parameters of integrator 70 and threshold detector 72 are such that it requires several periods of the modulation frequency $f_m$ for the output of integrator 70 to exceed the alarm threshold in response to a detected doppler-shifted frequency component. Thus the waveforms in FIG. 3 represent a time-averaged frequency response. This becomes more important when noise is present, since such noise is less likely to produce a false alarm as the time is increased during which the noise is averaged.

The foregoing explanation has described the manner in which an alarm signal is produced by the receiver circuit shown in FIG. 2 in response to doppler-shifted signals produced by an intruder moving toward or away from the receiving transducer. The circuit shown in FIG. 2 additionally has the ability to discriminate against certain types of conditions which would otherwise produce false alarm signals. This is explained below.

Frequently, there is movement of objects in the protected area other than intruders. Such movement might be, for example, curtains moved by a breeze or a draft from heating and cooling equipment. These false alarm conditions may be distinguished from the doppler-shifted signals produced by a true intruder by the fact that these signals are produced by movement of objects which normally do not have a net movement with respect to the receiving transducer when averaged over time. Thus, a fluttering curtain produces doppler-shifted signals, but when examined, these doppler-shifted signals are not representative of a net movement toward or away from the receiving transducer.

Referring to lines 96 through 102 of FIG. 3, the operation of the circuit of FIG. 2 is described for such false alarm conditions. In line 96, in response to a frequency transmitted by the transmitting transducer, doppler-shifted signals are produced both above and below the transmitted signal $f_1$. This is due to the fact that movement is both toward and away from the receiving transducer. Similarly, in line 98, doppler-shifted signals are produced above and below transmitted frequency $f_2$. In column B, the output from low pass filter 54 for such signals is shown; and it can be seen that this output is the same when the transmitter is transmitting either the $f_1$ or $f_2$ frequencies. In column C the output signal from low pass filter 60 is shown and this signal is also the same for both transmitted frequencies. Referring again to FIG. 5, the actual waveform from low pass filter 60 for the case of back and forth motion is shown by waveform 132. This waveform comprises bursts of energy occurring at a frequency of twice the modulation $f_m$. When rectified, the waveform applied to bandpass filter 66 is as shown by waveform 134 in FIG. 5. The output from rectifier 64 also consists of bursts at a frequency of $2f_m$. These pulses are applied to bandpass filter 66. Since these pulses do not occur at the resonance frequency of the bandpass filter, the filter does not respond to such pulses; and the output from bandpass filter 66 remains at zero or at a very low value, as shown by waveform 136. Thus, in response to doppler-shifted signals produced by an object moving back and forth and having no relative movement with respect to the receiving transducer, the processor shown in FIG. 2 will not produce an alarm signal.

There are two additional false alarm situations which the circuitry in FIG. 2 is capable of distinguishing from actual intrusions. The first situation occurs when there is a relatively high level of broad band background noise in the ultrasonic frequency range used by the intrusion alarm system. The second case is where pulses of narrow band noise, such as harmonics of telephone bells, are produced in the frequency band used by the alarm system.

In lines 104 through 110 of FIG. 3, the response of the circuit of FIG. 2 is shown for the situation in which there is a high level of broad band noise. From the previous explanations and the waveforms in FIG. 3, it can be seen that the output from low pass filter 60 in response to a high noise level is as shown in column C of lines 104 to 110. Referring to FIG. 5 again, waveform 138 is representative of the output signal from low pass filter 60. After rectification by rectifier 64, the signal applied to the input of bandpass filter 66 is as shown in waveform 140. In response to such a waveform, bandpass filter 60 does not respond, and the output therefrom is as shown by waveform 142 in FIG. 5.

For the case of periodic pulses of interfering noise, lines 112 through 118 show the spectral response of the circuit in FIG. 2. Unless the pulses of noise have a repetition frequency equal or close to the modulation frequency, $f_m$, the receiver circuit shown in FIG. 2 will not provide an alarm indication in response to such noise pulses; and such noise pulses generally do not produce a false alarm.

Thus, the circuitry shown in FIG. 2 for processing the output signal from a receiver transducer, when used in conjunction with the transmitter circuitry shown in FIG. 1, provides a system in which inexpensive processing circuitry may be included with each receiver transducer to provide an output indication of the presence of a moving intruder within a protected area while providing discrimination against other disturbances in the protected area which would otherwise cause false alarms.

Referring to FIG. 6, a receiver circuit is shown which is an alternate embodiment of the receiver processor shown in FIG. 2. As in FIG. 2, a receiving transducer 50 receives echoes from the protected area. The output signal from transducer 50 is detected in synchronous detector 52 with the reference frequency $f_c$ applied to a second input thereto. The output from synchronous detector 52 is applied to low pass filter 54. The output of low pass filter 54 is applied via an amplifier 66 to notch filter 58 and low pass filter 60; and the output from low pass filter 60 is rectified by rectifier 64. The previous circuitry operates in exactly the same manner as does the corresponding circuitry shown in FIG. 2 and described above.

The output signal from rectifier 64 is inverted via an inverter 150 and applied to one terminal of an electronic switch 152. The non-inverted output from rectifier 64 is applied to the second terminal of electronic switch 152. In response to a signal on a line 154, electronic switch 152 selects between the inverted and non-inverted output signals from rectifier 64, and the selected signal is applied to the input of an integrator 156. The control signal applied on line 154 to switch 152 is derived from the modulation signal $f_m$ in the transmitter circuitry shown in FIG. 1. The modulation signal $f_m$ is applied to a delay circuit 158 which produces a delay in the signal before it is applied to switch 152. Delay circuit 158 compensates for the delay through filters 54, 58 and 60 in the receiver circuitry and for the propagation time of the ultrasonic signals from the transmitting transducers. This may be more clearly seen by referring to the waveforms shown in FIG. 7. The $f_m$ waveform from the transmitter shown in FIG. 1 is shown as waveform 174 in FIG. 7. The delayed $f_m$ waveform which is applied to electronic switch 152 in the receiver circuitry of FIG. 6 is shown as waveform 176 in FIG. 7.

Figure 7:
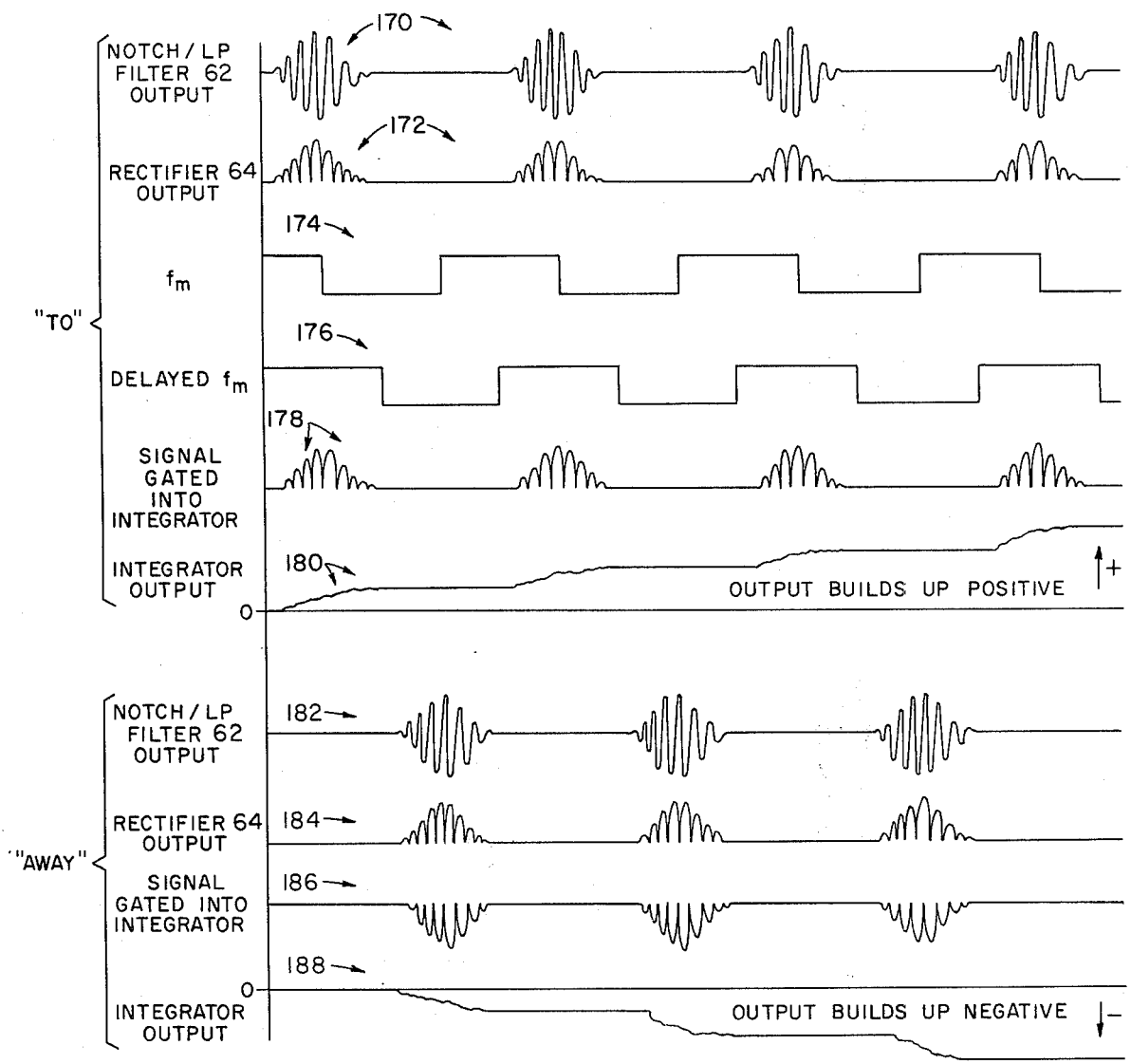
FIGS. 7, 8, and 9 show timing diagrams useful in explaining the operation of the receiver processor shown in FIG. 6.

From transducer 50 through rectifier 64, the circuits of FIGS. 2 and 6 are identical. Referring back briefly to FIG. 3, lines 80 through 94 show that for motions towards or away from the receiver transducer, the output from low pass filter 60, as shown in column C, is present only during alternate half cycles of the $f_m$ modulation signals. In FIG. 7, the upper waveforms 170 through 180 represent waveforms produced by the circuit of FIG. 6 in response to movement of an object toward the receiver transducer. The output from rectifier 64 is shown in waveform 172. As can be seen by comparing waveforms 172 and delayed $f_m$ waveform 176, the output from rectifier 64 is only present during periods when the delayed $f_m$ signal is high. Thus, the signal gated into integrator 156 via switch 152 comprises only positive signals directly from rectifier 64, as shown by waveform 178. This signal is integrated by integrator 156 and the resulting output signal is shown by waveform 180.

In response to movement of an object away from the receiving transducer, the operation of the circuitry in FIG. 6 is similar, with the exception that the pulses from low pass filter 60 occur during the other half cycles of the modulation signal $f_m$. This is shown in waveform 182 where the doppler-shifted frequency bursts occur periodically during the time that the delayed $f_m$ waveform is low. Rectifier 64 passes only the positive peaks of waveform 182 to produce an output signal as shown by waveform 184. Since these frequency bursts from rectifier 64 occur only during the periods when the delayed $f_m$ signal is low, the signal applied to integrator 156 by switch 152 in response to the delayed $f_m$ signal 176 is the inverted rectifier output from inverter 150. This signal is shown by waveform 186 in FIG. 7. Waveform 186 is integrated by integrator 156 to produce an output waveform from integrator 156 as shown by waveform 188. This waveform slowly increases in a negative direction in response to the rectified and inverted pulses applied to integrator 156.

Following integrator 156 is an absolute value circuit 190 which responds to positive and negative inputs to produce a signal at its output which is representative of the magnitude but not the polarity of the input signal. The output from absolute value circuit 190 is applied to a threshold circuit 192 which detects when the magnitude of the output from intergrator 156 has reached a predetermined threshold level and produces an alarm signal in response thereto.

Figure 8:
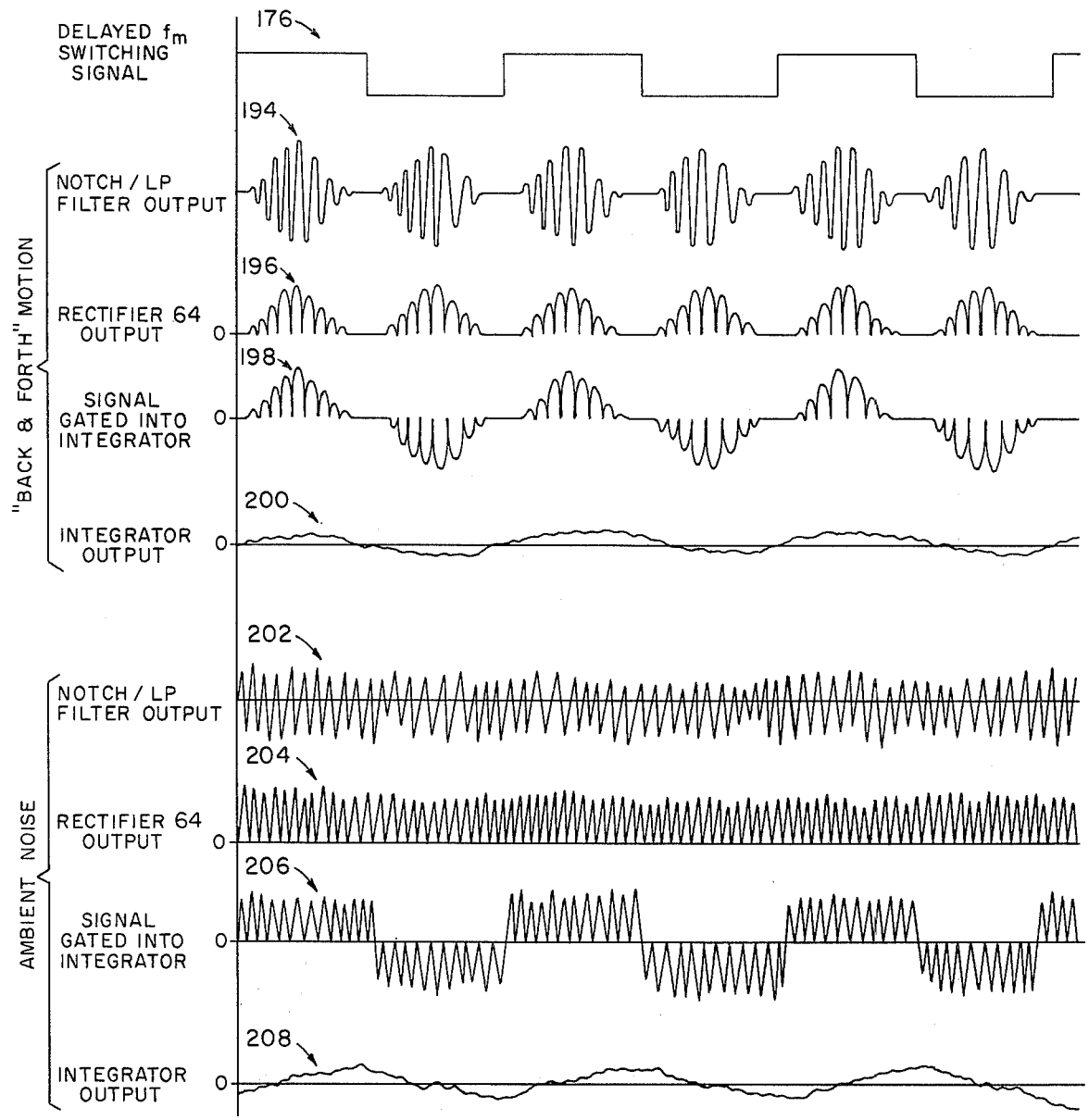

The circuit shown in FIG. 6 is similar to that shown in FIG. 2 in that it also rejects signals from receiving transducer 50 which are produced by an object moving back and forth in the protected area. This may be seen by referring to the waveforms shown in FIG. 8. The delayed $f_m$ signal 176 is shown at the top of FIG. 8. Referring back to waveforms 96 through 102 of FIG. 3, it can be seen that the low pass filter 60 produces an output signal during each half-cycle of the $f_m$ modulation frequency. This signal is shown by waveform 194 in FIG. 8. The output from rectifier 64 in response thereto is shown by waveform 196.

Waveform 196 contains frequency bursts during each half-cycle of the $f_m$ modulation signal. Thus, the input to integrator 156 is non-zero during all half-cycle periods of waveform $f_m$. However, since switch 152 alternates between the inverted output and the non-inverted output from rectifier 64, then polarity of the signal applied to the input of integrator 156 is alternately positive and negative. Waveform 198 shows the signal applied to the input of integrator 156 by switch 152 in the presence of back and forth motion. When waveform 198 is integrated, the output from integrator 156 oscillates around zero in response to the positive and negative inputs. This is shown in waveform 200. However, the integrator output will not build up in either a positive or negative direction, and threshold circuit 192 is not triggered. Thus, the circuit of FIG. 6 does not produce false alarms in response to back and forth motion in the protected area.

Ambient noise is also rejected by the circuit of FIG. 6 to avoid false alarm signals. This occurs in the following manner. Referring to the waveform in the lower part of FIG. 8, the output from filter 62 in response to a broad band noise in the protected area is shown by waveform 202. This signal is rectified by rectifier 64, and the waveform shown as 204 and its inverse are applied to switch 152. In response to the delayed $f_m$ signal, switch 152 alternately selects the signal from rectifier 64 and its inverse. The signal applied to the input of integrator 156 is shown in waveform 206. Since the average value of this signal is zero, the output from integrator 156 does not increase in a positive or negative direction, as shown by waveform 208; and the circuit of FIG. 6 will not produce an alarm signal. Similarly, the circuit of FIG. 6 does not produce false alarm signals in response to impulse noise.

The circuit shown in FIG. 6 may be adjusted to reduce the sensitivity of the receiver to echoes from objects or disturbances occurring close to the receiver. Since echoes from nearby objects usually are significantly stronger than echoes from objects farther away, and since it is usually desirable for the response time of the circuit to be more or less constant for objects detected throughout the protected area, such capability further enhances the performance of the receiver.

Figure 9:
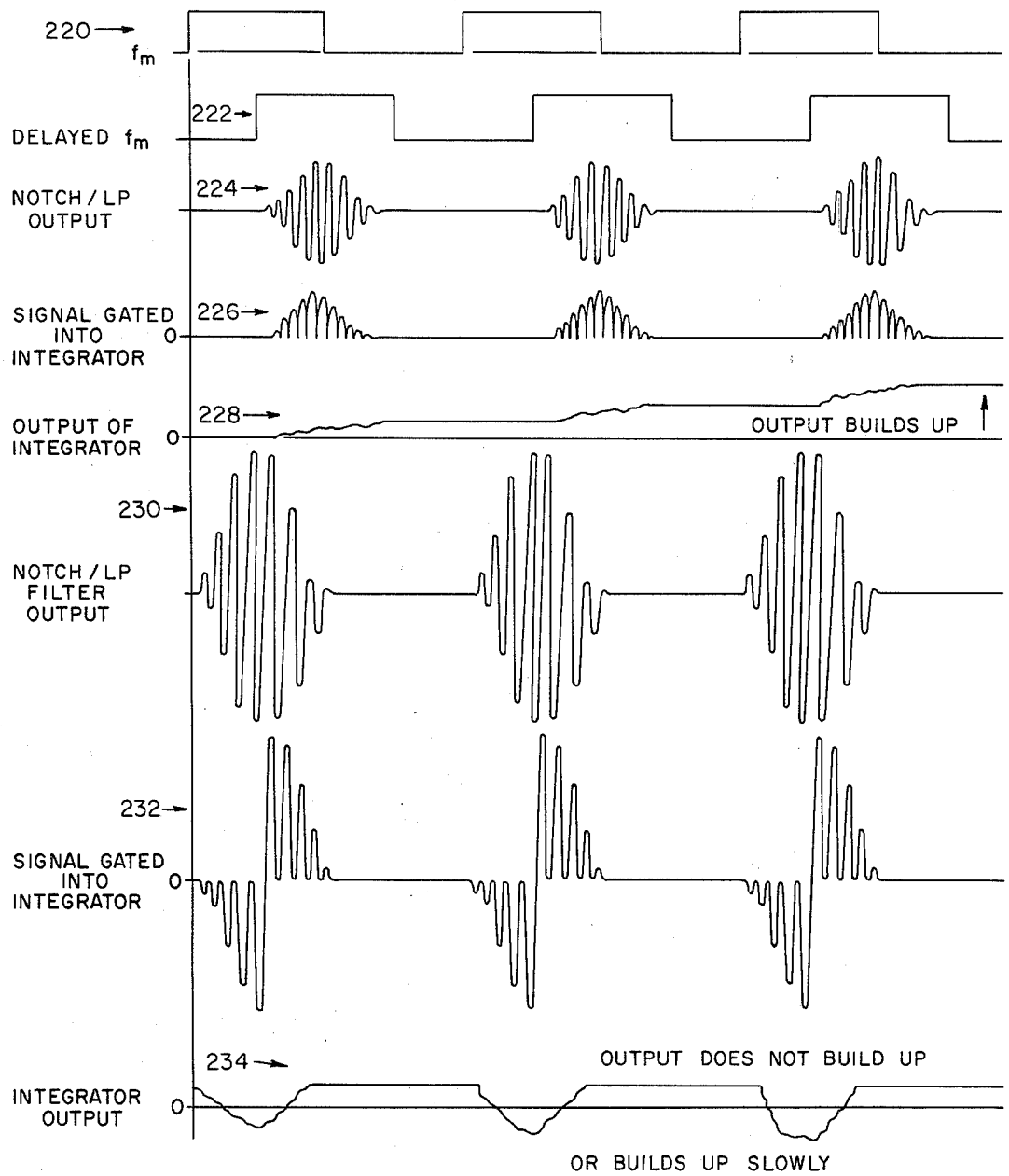

Referring to FIG. 9, waveforms 220 to 228 illustrate the response of the circuit of FIG. 6 to an echo from a moving object at some intermediate distance from the receiver. These waveforms are essentially identical to waveforms 170 to 178 explained above with reference to FIG. 7. If the receiving transducer receives a strong echo from a nearby object, the output from low pass filter 60 is as shown in line 230. This output differs in two respects from the low pass filter output produced by a more distant object shown in line 244. First, the amplitude of the echo is much larger. Second, since the object is closer to the receiving transducer, the echo is received sooner. Thus, a frequency burst received from a nearby object, as shown in line 230, is advanced in time with respect to a frequency burst from an object farther away, as shown by waveform 224.

The advancement in time of an echo returned by a nearby object causes a part of the resulting output from loss pass filter 60 to occur prior to the transitions of the delayed $f_m$ signal 222, as shown in FIG. 9. The first part of an echo from a nearby object is applied via switch 152 to the input of integrator 156 with a first polarity, while the second part of the echo is applied to the input of the integrator with the opposite polarity. This is shown via waveform 232 in FIG. 9 which illustrates the signal applied to integrator 156 in response to an echo from a nearby object. The integrator output in response to such a signal is shown in waveform 234. The result is that the output from integrator 156 increases less rapidly than would be the case for an object farther away, and this result compensates for the increased amplitude of echoes received from nearby objects.

Figure 10:
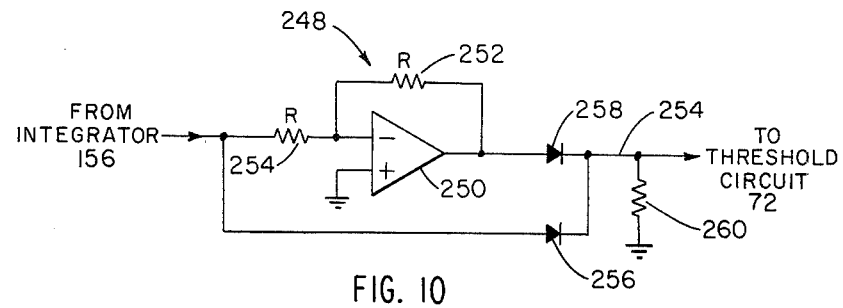
FIG. 10 shows one mean of implementing the absolute value circuit of FIG. 6.

Referring to FIG. 10, there is shown one means for implementing absolute value circuit 190. The output from integrator 156 is applied to the input of a unity-gain inverting amplifier 248. Amplifier 248 is conventionally constructed from an op-amp 250 having a resistor 252 of value R connected between the inverting input of op-amp 250 and the output of op-amp 250 and having an input resistor 254 of value R connected to the inverting input of the op-amp. The non-inverting input of op-amp 250 is grounded.

The output signal to threshold circuit 72 is taken from node 254. The signal from integrator 156 is connected directly to node 254 via a diode 256. The output from the inverting amplifier circuit 248 is applied to node 254 via a second diode 258. A load resistor 260 is connected between node 254 and ground.

When the output from integrator 156 is positive, diode 256 conducts and the signal from integrator 156, less the voltage drop across diode 256, is applied to threshold circuit 72. In response to a positive input, the output signal from op-amp 250 is negative due to the inverting operation of amplifier 248, and diode 258 is reversed biased and does not conduct. In response to a signal from integrator 156 having a negative polarity, this signal is inverted by amplifier 248, and a positive output signal from op-amp 250 is applied via diode 258 to threshold circuit 72. Diode 256 is reversed biased by the negative input signal from integrator 156 and the positive voltage at node 254.

Figure 11:
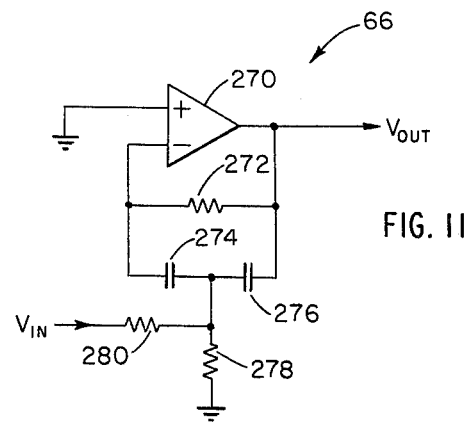
FIG. 11 shows one circuit for implementing the bandpass filter of FIG. 2.

Referring to FIG. 11, one exemplary circuit for implementing the modulation frequency bandpass filter 66 is shown. An op-amp 270 has its non-inverting input connected to ground. The output of op-amp 270 is connected to its inverting input via a resistor 272 in parallel with series connected capacitors 274 and 276. The junction between capacitors 274 and 276 is connected to ground by a resistor 278. The input voltage is applied to the junction of capacitors 274 and 276 via a resistor 280.

The circuit shown in FIG. 11 has essentially the same transfer function as a parallel RLC bandpass filter circuit. The pole-zero plot of such a circuit consists of a conjugate pole pair with a zero at the origin. Due to the typically low frequency of the modulation frequency $f_m$ bandpass filter 66 is more easily implemented in active filter form. By chosing appropriate values for the components shown in FIG. 11, the desired values for the gain, Q, and center frequency of the filter may be realized. Typically, the Q of bandpass filter 66 is chosen to be 10. Values of Q as low as 7 and as high as 15 may be used. For a Q of 7, the response time is faster, but the system is more responsive to noise. For a Q of 15, the noise immunity is higher but the system requires longer to respond to the presence of an intruder.

Figure 12:
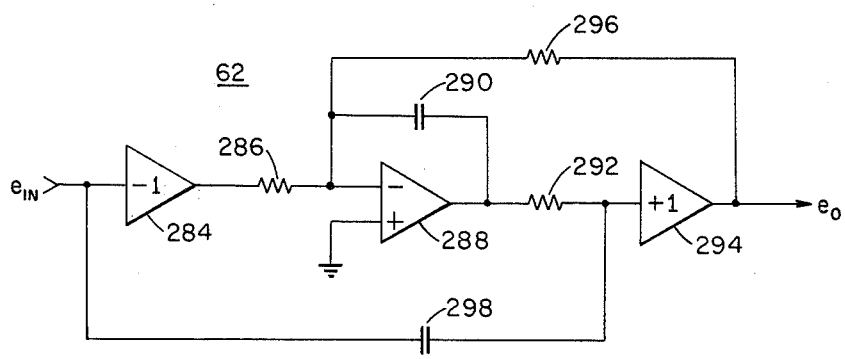
FIG. 12 shows one circuit for implementing the notch and bandpass filter of FIGS. 2 and 6.

Referring to FIG. 12, there is shown a circuit for implementing notch and low-pass filter 62. The input to this circuit is applied to a buffer amplifier 284 having a gain of −1. The output from amplifier 284 is applied via an input resistor 286 to the inverting input of an operational amplifier 288. The non-inverting input of op-amp 288 is grounded. A capacitor 290 is connected between the inverting input and the output of op-amp 288. The output signal from op-amp 288 is applied via a resistor 292 to a non-inverting buffer amplifier 294. The output signal from buffer amplifier 294 is fedback via a resistor 296 to the inverting input of op-amp 288. A capacitor 298 is connected between the input of buffer amplifier 284 and the input of buffer amplifier 294.

The circuit shown in FIG. 12 provides the transfer function shown in graph 63 of FIG. 4. It is not necessary to completely attenuate the signal above $\Delta f$. It is only necessary to have the frequencies below $\Delta f$ be significantly stronger than those above $\Delta f$ so that rectifier 68 responds to the baseband signal below $\Delta f$.

The value of $\Delta f$ is chosen so that the center of doppler-shifted signals typically received is centered about $f_c$. For a center frequency $f_c$ of 26.5 kHz, this is approximately 100 Hz. Since the doppler shift is proportional to the transmitter frequency, different frequencies will require different values of $\Delta f$. Typically, the valued chosen for $\Delta f$ should be approximately 0.38% of the reference frequency $f_c$. For example, if a value of $f_c$ of 40 kHz is chosen, the optimum value of $\Delta f$ would be about 150 Hz.

The upper limit of the modulation frequency $f_m$ is constrained by the expected propagation time. The lower limit for $f_m$ is constrained by the response time of the filtering and averaging circuitry in the receiving electronics. For typical systems, 3 Hz has been found to be nearly optimum for the value of $f_m$.

The foregoing explanation has described a novel ultrasonic alarm system in which preprocessing of the transmitter signal allows much simpler receiver circuitry to detect doppler-shifted echoes indicating the presence of an intruder while rejecting similar echoes caused by non-intrusive objects which would otherwise produce a false alarm. Accordingly, the present invention provides an improved intrusion alarm system while reducing the cost and complexity thereof. Modifications and additions to the exemplary circuits described herein may be made in applying the present invention to different situations, and the scope of the invention should not be taken as restricted to the disclosed circuitry; but rather the scope of the present invention should be limited only in accordance with the appended claims.

What is claimed is:

1. An intrusion detection system for detecting the presence of moving objects in a protected area, comprising:

transmitter means for transmitting waves into the protected area, including means, responsive to a modulation frequency, for alternately transmitting waves of a first frequency and waves of a second frequency, the transmitter alternating between the first and second frequency at a rate determined by the modulation frequency;

receiving means for receiving echoes resulting from reflection of the transmitted waves by objects in the protected area and for providing an output signal representative of the received signal; and processing means responsive to the receiving means output signal for detecting frequency components in the receiving means output signal representative of doppler-shifted echoes from moving objects in the area, and for providing an alarm signal only in response to the detection of frequency components which are substantially either all above or all below the transmitted frequencies and further selectively responsive to the modulation frequency, thereby detecting objects having a net movement with respect to the receiving means which reflect said alternating first and second frequencies.

2. The system of claim 1 wherein the processing means includes means for averaging the detected signal components in the receiving means output signal representative of echoes from moving objects so that the processing means provides an alarm signal only in response to echoes representative of an object having a net movement with respect to the receiving means when averaged over an interval of time determined by the averaging means.

3. An intrusion detection system for detecting the presence of moving objects in a protected area, comprising:
transmitter means for the transmitting waves into the protected area, including means, responsive to a modulation frequency, for alternately transmitting waves of a first frequency and waves of a second frequency, the transmitter alternating between the first and second frequency at a rate determined by the modulation frequency;
receiving means for receiving echoes resulting from reflection of the transmitted waves by objects in the protected area and for providing an output signal representative of the received signal; and
processing means responsive to the receiving means output signal for detecting signal components in the receiving means output signal representative of echoes from moving objects in the area, and for providing an alarm signal in response to echoes representative of an object having a net movement with respect to the receiving means, wherein the processing means includes:
doppler frequency sensing means for sensing the presence in the receiving means output signal of signal components representative of doppler-shifted echoes produced by moving objects in the protected area, and for producing an output signal representative of the doppler-shifted echoes; and
modulation frequency sensing means for monitoring the doppler frequency sensing means output signal to detect the presence therein of frequency components at the modulation frequency and for producing an alarm signal in response to the presence of such modulation frequency components.

4. The system of claim 3 wherein the waves transmitted by the transmitter means are acoustic waves.

5. The system of claim 4 wherein the acoustic waves transmitted by the transmitter means are in the ultrasonic frequency range.

6. The system of claim 3 wherein the doppler frequency sensing means includes:
means for producing a reference frequency having a frequency intermediate the first and second frequencies; and
demodulator means, having a first input to which is applied the receiving means output signal and a second input to which is applied the reference frequency, for demodulating the receiving means output signal to provide a demodulator output signal representative of received doppler-shifted echoes.

7. The system of claim 6 wherein the doppler frequency sensing means includes filter means for attenuating signal components in the demodulator output signal representative of the signal transmitted by the transmitting means.

8. The system of claim 7 wherein the doppler frequency sensing means further includes a low pass filter for attenuating signal components in the demodulator output signal having frequencies higher than the signal components representative of the transmitted signal which are attenuated by the filter means.

9. The system of claim 8 wherein the first frequency is equal to the reference frequency minus an offset frequency; and
wherein the second frequency is equal to the reference frequency plus the offset frequency.

10. The system of claim 9 wherein the filter means includes a notch filter having a center frequency equal to the offset frequency.

11. The system of claim 10 wherein the low pass filter has a frequency characteristic such that it attenuates frequencies lying above the offset frequency.

12. A receiver for use with an ultrasonic intrusion detection system having a transmitter which alternately transmits acoustic signals of first and second frequencies into a protected area, said transmitter alternating between the first and second frequencies at a modulation frequency, the receiver for receiving echoes resulting from reflections of the transmitted signal by objects in the protected area and for providing an alarm signal in response to echoes representative of a moving object with the protected area, said receiver comprising:
a receiving transducer for receiving echoes resulting from reflections of the transmitted signal by objects in the area and for producing an electrical output signal representative of the received echoes;
doppler frequency sensing means for sensing the presence of signal components in the receiving transducer output signal representative of doppler-shifted echoes produced by moving objects in the protected area and for producing an output signal representative of such doppler-shifted echoes; and
modulation frequency sensing means for monitoring the doppler frequency sensing means output signal to sense the presence therein of frequency components equal to the modulation frequency, and for producing an alarm signal in response to the presence of modulation frequency components in the doppler frequency sensing means output signal.

13. The system of claim 12 wherein the doppler frequency sensing means includes:
means for producing a reference frequency intermediate the first and second frequencies such that the first frequency is equal to the reference frequency minus an offset frequency and the second frequency is equal to the reference frequency plus the offset frequency;
a demodulator having a first input to which is applied the receiving transducer output signal and a second input to which is applied the reference frequency to produce a demodulated output signal.

14. The system of claim 13 wherein the modulation frequency sensing means includes a notch filter having a center frequency equal to the offset frequency, the demodulated output signal being applied to an input of the notch filter, to provide an output signal in which signal components representative of the first and second frequencies transmitted by the transmitter are eliminated from the demodulated output signal; and
low pass filter means for attenuating signal components in the notch filter output signal having frequencies above the offset frequency.

15. The system of claim 14 further including rectifier means responsive to signals from the low pass filter means for rectifying the output thereof to provide a rectified output signal.

16. In an intrusion detection system of the type having a transmitter for transmitting acoustic waves into a protected area and a receiver for receiving echoes resulting from reflections of the transmitted waves by objects in the protected area and for detecting doppler-shifted frequency components in the received echoes representative of the presence in the protected area of a moving object, the improvement comprising:

means in the transmitter for producing a first frequency;

means in the transmitter for producing a second frequency;

means in the transmitter for producing a modulation frequency;

means in the transmitter for causing the transmitter to alternately transmit acoustic waves into the protected area at the first and second frequencies, alternating therebetween at a rate determined by the modulation frequencies; and means in the receiver for detecting doppler-shifted frequency components and for discriminating against false alarm conditions, including:

doppler-frequency sensing means for demodulating the received echoes with a frequency intermediate the first and second frequencies to produce a demodulated output signal;

modulation frequency sensing means responsive to the demodulated output signal for detecting frequency components therein equal to the modulation frequency and for producing an alarm signal in response to the detection of such modulation frequency components.

17. The receiver of claim 16 wherein the doppler frequency sensing means includes a synchronous detector.

18. A method of detecting the presence of moving objects in a protected area comprising the steps of:

transmitting acoustic waves into the protected area in a repetitive time sequence of first and second frequencies at a predetermined rate;

receiving reflections of the transmitted waves from objects in the protected area and producing an input signal representative thereof;

detecting the presence in the input signal of doppler-shifted frequency components resulting from reflections from moving objects in the protected area to produce an intermediate signal representative thereof;

detecting the presence in the intermediate signal of variations therein occurring at the predetermined rate corresponding to the transmitted sequence, and producing an alarm signal in response to a positive detection of the presence of such variations.

19. A method of detecting the presence of moving objects in a protected area comprising the steps of:

alternately transmitting acoustic waves into the protected area in a sequence of first and second frequencies;

receiving reflections of the transmitted waves from objects in the protected area and producing an input signal representative thereof;

detecting the presence in the input signal of doppler-shifted frequency components resulting from reflections from moving objects in the protected area to produce an intermediate signal representative thereof, wherein said step of detecting includes the steps of:

producing a reference frequency intermediate the first and second frequency;

demodulating the input signal with the reference signal to produce a demodulated output signal representative of the presence in the input signal of doppler-shifted frequency components; and detecting the presence in the intermediate signal of variations therein corresponding to the transmitted sequence, and producing an alarm signal in response to a positive detection of the presence of such variations.

20. The method of claim 19 wherein the first frequency is equal to the reference frequency minus an offset frequency and the second frequency is equal to the reference frequency plus the offset frequency; and further comprising the steps of:

notch filtering the demodulated output signal to eliminate therefrom frequency components equal to the offset frequency; and low-pass filtering the demodulated output signal to eliminate frequency components therein having frequencies above the offset frequency.

21. The method of claim 20 further including the steps of:

correlating the notch filtered and low pass filtered demodulated output signal with the transmitted sequence to provide a correlation signal representative of the correlation therebetween;

comparing the correlation signal with a threshold and producing the alarm signal in response to exceedance of the threshold by the correlation signal.

22. The method of claim 20:

wherein the transmitted sequence is produced by alternately switching between the first and second frequencies at a rate equal to a modulation frequency;

and wherein the second step of detecting further includes the steps of:

applying the notch filtered and low-pass filtered demodulated output signal to a band-pass filter having a resonance frequency equal to the modulation frequency;

monitoring the output from the band pass filter to detect an oscillatory response of increasing amplitude, and producing an alarm signal in response to such detection.

23. An ultrasonic intrusion detection system for detecting the presence of moving objects in a projected area, comprising:

transmitter means for transmitting acoustic waves into the protected area, including:

means, responsive to a modulation frequency, for producing a transmitter signal which alternates between a first frequency and a second frequency at a rate determined by the modulation frequency;

a plurality of transmitting transducers, responsive to the transmitter signal, for alternately transmitting acoustic waves at said first and second frequencies into the protected area;

a plurality of receiving transducers, each for receiving acoustic waves from the protected area, and for producing an electrical output signal representative thereof; and a plurality of processing means, equal in number to the plurality of receiving transducers, each processing means being associated with and connected to a respective one of the receiving transducers, each processing means being responsive to the associated receiving transducer output signal for detecting signal components in the receiving means output signal representative of echoes from moving objects in the protected area, and for providing an alarm signal in response to echoes representative of an object having a net movement with respect to the receiving transducer, each of the processing means including:

doppler frequency sensing means for sensing the presence in the receiving means output signal of signal components representative of doppler shifted echoes produced by moving objects in the protected area, and for producing an output signal representative of the doppler shifted echoes; and modulation frequency sensing means for monitoring the doppler frequency sensing means output signal to detect the presence therein of frequency components at the modulation frequency and for producing an alarm signal in response to the presence of such modulation frequency components.

24. The system of claim 3, 23, 6, 8, 11 or 16 wherein the modulation frequency sensing means further includes:

a band pass filter having a resonance frequency substantially equal to the modulation frequency;

means for applying the output of the doppler frequency sensing means to an input of the band pass filter; and output means responsive to signals from the band pass filter for sensing an oscillatory response of increasing amplitude and for producing an alarm signal in response thereto.

25. The system of claim 24 wherein the output means includes means for averaging the signals from the band pass filter over time so that an oscillatory response to a doppler-shifted echo must persist for more than one cycle of the modulation frequency to produce an alarm signal.

26. The system of claim 24 wherein the output means further includes:

means for rectifying the signals from the band pass filter;

means for integrating the rectified band pass filter output to produce an integrator output signal; and means for comparing the integrator output signal with a threshold for producing an alarm signal upon exceedance of the threshold by the integrator output signal.

27. The system of claim 3, 23, 6, 8, 11 or 16 wherein the modulation frequency sensing means further includes:

means for performing a correlation between the doppler frequency sensing means output signal and the modulation frequency to provide an output signal representative of the presence of modulation frequency components in the doppler frequency sensing means output signal.

28. The system of claim 27 wherein the correlation means includes:

means for inverting the doppler frequency sensing means output signal;

switch means responsive to the modulation frequency for providing an output signal which alternates between the doppler frequency sensing means output signal and the inverted doppler frequency sensing means output signal, in accordance with the modulation frequency; and means for filtering the switch means output signal and for detecting when the magnitude of the filtered switch means output signal has exceeded a threshold, an alarm signal being produced in response to such exceedance.

29. The system of claim 28 wherein the last-mentioned filtering means includes an integrator for integrating the switch means output signal to provide an integrator output signal.

30. The system of claim 29 wherein the modulation frequency sensing means further includes:

absolute value means for providing an output signal representative of the magnitude of the integrator output signal for both positive and negative polarities thereof; and threshold means for comparing the absolute value means output signal with a threshold and for providing the alarm signal in response upon exceedance of the threshold by the absolute value means output signal.

* * * * *